H. A. GRINE.
PROCESS OF MAKING PRODUCER GAS.
APPLICATION FILED FEB. 13, 1915.

1,313,180.

Patented Aug. 12, 1919.

Witnesses,
Edward T. Wray,
Bessie S. Rice.

Inventor.
Harry A. Grine.
by Parker & Carter
Attorneys.

H. A. GRINE.
PROCESS OF MAKING PRODUCER GAS.
APPLICATION FILED FEB. 13, 1915.

1,313,180.

Patented Aug. 12, 1919.
4 SHEETS—SHEET 4.

Witnesses
Edward T. Wray.
Bessie S. Rice.

Inventor.
Harry A. Grine.
by Parker & Carter
Attorneys.

UNITED STATES PATENT OFFICE.

HARRY A. GRINE, OF COLLINSVILLE, OKLAHOMA, ASSIGNOR TO GAS POWER MACHINERY COMPANY, OF LOS ANGELES, CALIFORNIA, A CORPORATION OF CALIFORNIA.

PROCESS OF MAKING PRODUCER-GAS.

1,313,180.            Specification of Letters Patent.      Patented Aug. 12, 1919.

Application filed February 13, 1915. Serial No. 7,943.

*To all whom it may concern:*

Be it known that I, HARRY A. GRINE, a citizen of the United States, residing at Collinsville, in the county of Rogers and State of Oklahoma, have invented a certain new and useful Improvement in Processes of Making Producer-Gas, of which the following is a specification.

My process has to do with the direct and continuous production of so-called producer gas from liquid hydro-carbon fuels. Producers or other such apparatus for manufacturing producer gas from liquid hydro-carbon fuels have long been in operation, but one salient characteristic of many such devices is that they cannot be run continuously but the process must be arrested at certain intervals both for the introduction of the fuel in some cases and in every case for the cleaning out of the producer before the process can again be carried out.

In my specification and claims I have used the term "partial combustion" and by this I mean to refer to such decomposition of the liquid hydro-carbon and such recombination with oxygen as will form what is commercially designated as "producer gas." It is to be understood that this gas is principally composed of carbon monoxid (CO), hydrogen ($H_2$), ethylene ($C_2H_4$), methane ($CH_4$) as its combustible constituents; a small per cent. of carbon dioxid ($CO_2$) and nitrogen (N) from the air used in supplying oxygen, and water being the inert constituents of the gas. It will be obvious, of course, that other compounds might be present and might vary in proportion and still come within the class generally known as "producer gas." The heat value will be approximately from 125 to 150 thermal units per cubic foot. One of the objects of my invention is to carry out a process which will result in the formation of so-called producer gas without the production of an unmanageable amount of free carbon during gasification by a partial combustion of the hydrocarbon, thus doing away with the necessity of shutting down the gasifying units and cleaning them out and thus obviating the necessity of providing duplicate gasifying units for continuous operation and supply. It has been customary in the production of producer gas from the liquid hydro-carbon fuels to supply the liquid hydro-carbon fuel to the gasifying chamber in such manner that a flame burning in a surrounding atmosphere of air results. When this is done certain pecularities occur or prevail and the flame has among others the following characteristics: It contains an inner central portion rich in fuel and in contact with little if any air and an outer sheath lean in fuel in contact with an excess quantity of air. It is, of course, obvious that there will be no marked stratification, but there will be a gradual change from the inner rich or excess fuel area to the outer excess air area, and at some points a correct portion prevails but this correct proportion only prevails throughout a very small portion of the flame. The inner portion being rich in hydro-carbon and surrounded by the hot burning outer sheath, undergoes destructive distillation producing free carbon or lamp black. Theoretically, this free carbon or lamp black should, on coming in contact with more air and hot $CO_2$ gases, be converted into carbon monoxid. As a matter of fact, however, experience shows that this result cannot be obtained because of the excessive amounts in the presence of more readily combustible gases. This free carbon or lamp black constantly increases in amount as the process continues, gradually fills up the producer, and it is this production of free carbon which necessitates the usual expensive duplication of units and expensive scrubbing apparatus when the gas forming process must be continuous.

Generally speaking, in my process I prevent the formation of free carbon in any considerable quantity by forming a homogeneous mixture of liquid hydrocarbon fuel and air, such that all the air required for partial combustion will be present and mixed up in the homogeneous mixture before partial combustion takes place. I thus secure a relatively quiet combustion without local flame. This result may be accomplished in a number of different ways. I prefer to accomplish it by maintaining within the gasifying chamber two zones which may be designated as the volatilizing and diffusion zone and the combustion zone. The zones may be preferably found both in the same producer or they may be separate. They may be merely different parts of the same combustion chamber or they may be separate combustion chambers either in the same producer or in separate producers in proper communication one with the other.

The temperature of the volatilizing and diffusion zone must be maintained above the volatilizing temperature of the liquid hydrocarbon fuel but below its burning temperature and the temperature of the combustion zone must be maintained above the burning temperature of the liquid fuel. The temperature of the volatilizing and diffusion zone may be controlled in any number of suitable ways. It is possible to cool the walls of the diffusion zone to have cooling bodies in the zone or to cool it by means of steam or water injected inside the walls.

I find it convenient and of advantage but not absolutely necessary, to pass the gases, before leaving the gasifying chamber, through a bed of coke or other solid carbonaceous or carbon bearing material in order to absorb any small amount of ungasified hydro-carbon such as tar and a very slight deposit of carbon. This carbon bed acts as a fixing chamber and helps to produce a more uniform gas when fluctuations occur in the liquid hydrocarbon fuel supply. Broadly speaking, any one of many kinds of beds could be employed, but my experience leads me to prefer a carbonaceous bed, which may in the first instance be formed in any desired manner and may be thereafter kept up in any desired manner, but which in fact very slowly disintegrates and in actual practice is more or less effectively protected and maintained by the slight deposit of free carbon produced in the combustion chamber.

The means for controlling the temperature of the volatilizing and diffusion zone may generally be divided into two classes, viz: exterior or external means and interior or internal means and in the latter class would come the use of steam or vapor which is fed into the chamber either with or without the fuel or the use of cooling coils. I prefer to make use of the internal means to cool the volatilizing and diffusion zone by introducing into said zone a suitable supply of vapor, air or steam and since steam is easily controlled and produced I find that steam is the most satisfactory medium for limiting and controlling the temperature of the volatilizing and diffusion zone.

Experience shows that the use of steam to control the temperature of the volatilizing and diffusion zone, when a solid or carbonaceous bed is used, does not cause excessive production of free hydrogen in the gas when a solid carbonaceous bed not exceeding approximately three feet in depth is used. Owing to the rapid travel of the gas through this bed and the short duration of contact with the hot carbon very little of the steam is decomposed and it passes out of the gasifying chamber to be condensed from the gas in the scrubber. I have seldom found hydrogen exceeding 10% in gas made by my process.

My invention, therefore, is illustrated more or less diagrammatically in the accompanying drawings, wherein—

Like parts are indicated by like letters throughout the several figures.

Figure 1:
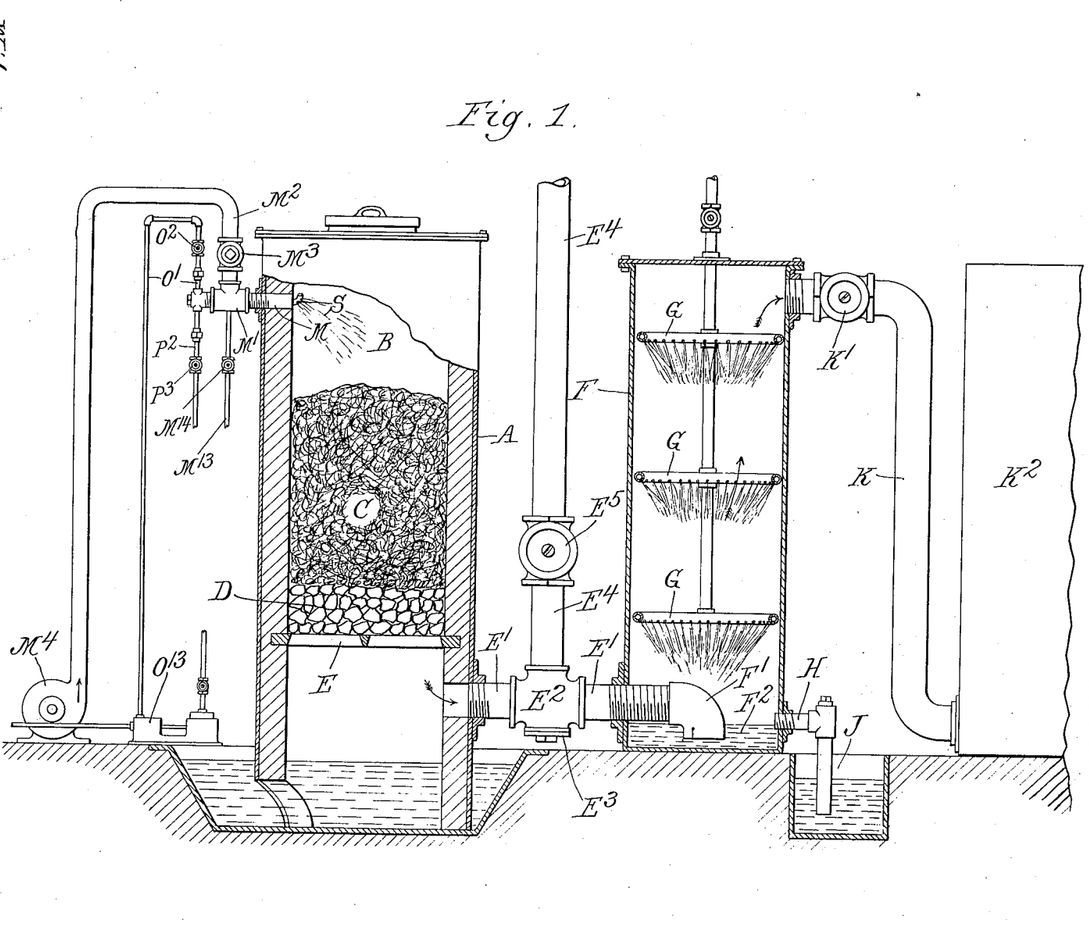
Figure 1 is a diagrammatic view of a producer plant in part section and part elevation, parts broken away and parts omitted.

A is a producer housing case preferably termed the "producer" containing the volatilizing and diffusion chamber B which, in the present instance, is merely the upper half of the producer. C, the lower half of the producer, is the combustion chamber. D is a carbonaceous fuel bed at the bottom of and forming a part of the combustion chamber and resting upon the grate E. $E^1$ is the gas escape pipe leading from the bottom of the producer or generator to and through the wall of the scrubber F and discharging through the elbow $F^1$ into the water seal $F^2$ in the bottom of the scrubber. $E^2$ is a cross located in the pipe $E^1$. It has a clean-out handhole $E^3$ at the bottom and discharges into the purge stack $E^4$ at the top controlled by a valve $E^5$.

H is the water outlet pipe from the bottom of the scrubber discharging into the water into the tank J. This outlet is so positioned that the elbow $F^1$ at the end of the pipe $E^1$ is always submerged thus forming a water seal. G G are cooling spray pipes or members located in the scrubber for the purpose of cooling the gas as it passes up from the water seal to the discharge pipe K which communicates with the top of the scrubber controlled by a valve $K^1$ and leading to the gasometer $K^2$.

M is an inlet pipe in the top wall of the producer and is used for the purpose of introducing air or steam or both into the interior of the producer. It communicates with the T $M^1$ and air supply pipe $M^2$ controlled by the valve $M^3$ and fed by a blower $M^4$. $M^{13}$ is an auxiliary pipe discharging into the T $M^1$ controlled by the valve $M^{14}$ for the purpose of supplying additional air, steam, or water vapor as the case may be.

Figure 2:
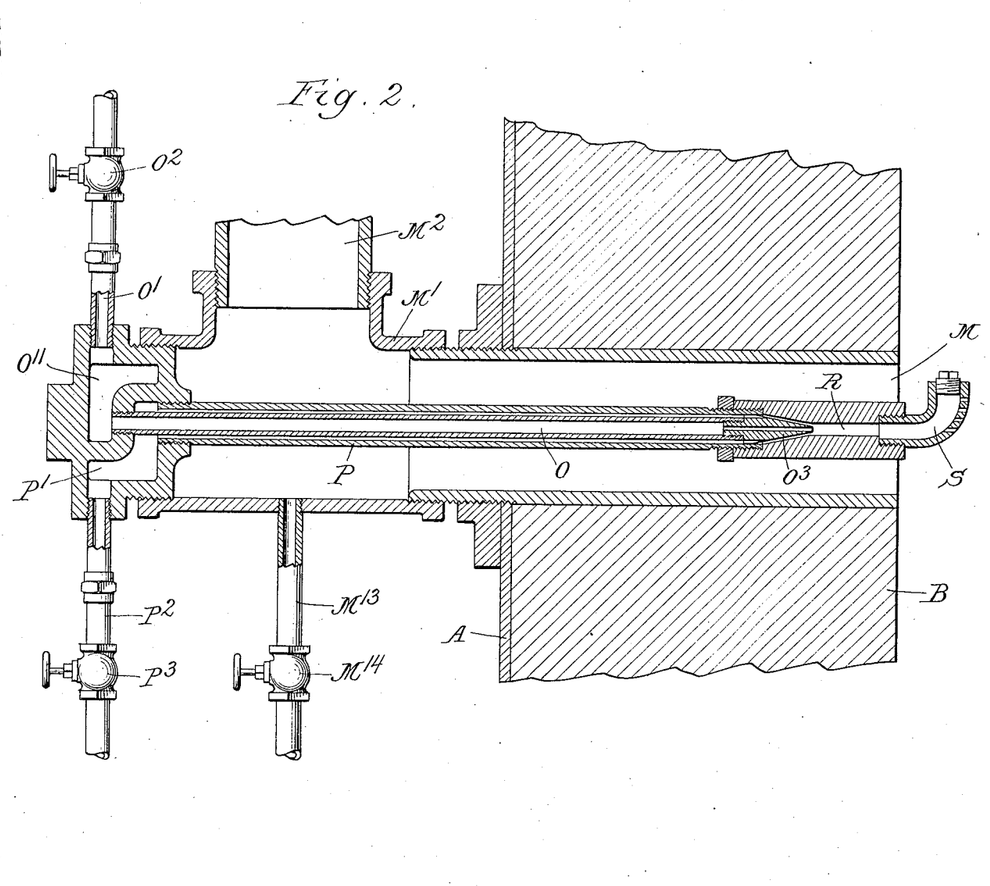
Fig. 2 is a detail vertical cross section of a suitable device for introducing air, liquid hydro-carbon and steam.

O is an oil pipe centrally disposed in the pipe M communicating with an oil chamber $O^{11}$ which chamber is supplied with oil through the pipe $O^1$ controlled by the valve $O^2$ from the pump $O^{13}$ which in turn is supplied from the source of supply not here shown. $O^3$ is an oil discharge nozzle on the end of the oil pipe O. It is contained within and discharges with the mixing head R. This mixing head R is supported by a steam pipe P which pipe is fed from the chamber $P^1$ by steam or water vapor or other suitable material delivered through the pipe $P^2$ controlled by the valve $P^3$. It will be noted that the steam and oil parts act together about the center of the pipe M and discharge through the curved slotted discharge and spray head S into the interior of the producer in such wise that the steam, oil and air are together blown into and diffuse within the volatilizing and diffusion chamber.

Figures 3, 4, 5, 6:
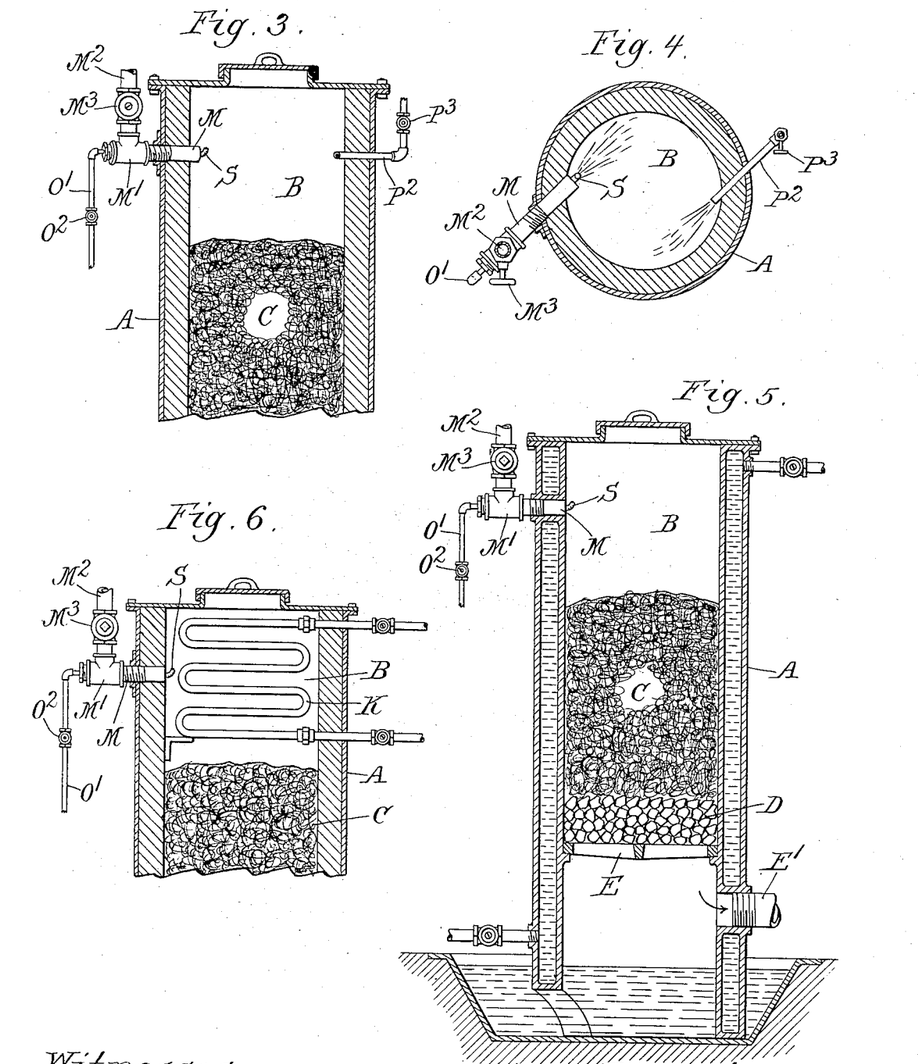
Figs. 3, 4, 5 and 6 are detailed sections through a modified form of producer.

In the modification shown in Figs. 3 and 4 it will be noted that the steam, oil and air are separately discharged into the combustion chamber in such manner that the different currents commingle one with the other and those materials are broken up and mixed or commingled.

In the form shown in Fig 5, it will be noted that the diffusion chamber is cooled by means of a cooling jacket which surrounds the outer wall and is fed by cooling water from any suitable source of supply.

In the modification shown in Fig. 6, it will be observed that cooling coils K are located in the diffusion chamber itself in such manner that the oil or fuel and air as they come in contact with these coils are cooled by them since they are kept cool by any water supply indicated.

Figures 7, 8:
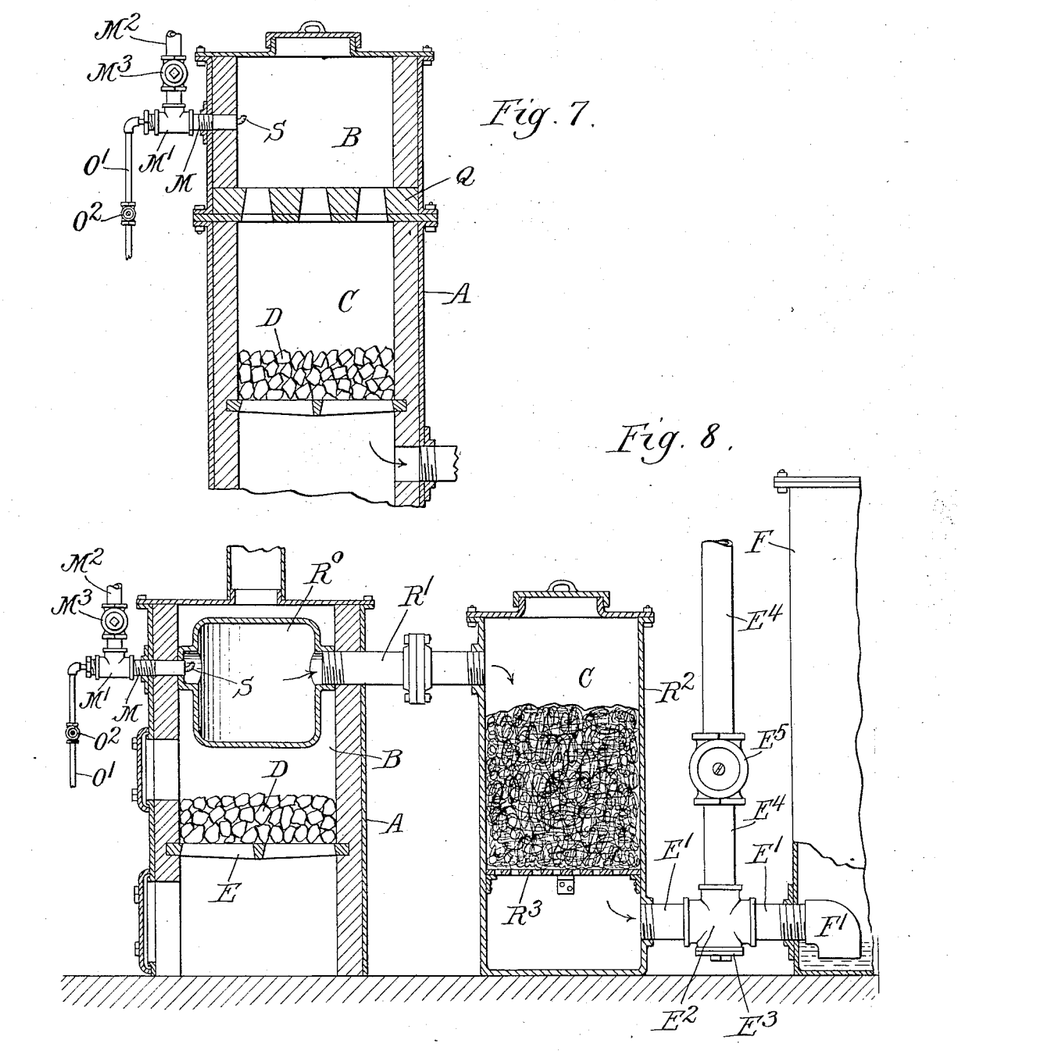
Fig. 7 is a detailed modification showing the diffusion zone heated from a source other than the combustion zone.
Fig. 8 is a section through a modified form.

In the modification shown in Fig. 7, Q. is a dividing wall which separates the combustion chamber from the volatilizing and diffusion chamber and in this particular instance it will be noted that I have illustrated the device with the carbonaceous settling bed. It is, of course, obvious that this bed may be dispensed with or a bed may be made of any suitable material not necessary entirely or even at all carbonaceous in its original makeup so that the excess carbon deposit, if there is any, may or may not be caught thereby.

It will be evident that while I have shown in my drawings an operative device, still many changes might be made both in size, shape and arrangement of parts without departing from the spirit of my invention, and I wish, therefore, that my drawings be regarded as in a sense diagrammatic.

In the modification shown in Fig. 8, $R^0$ is a retort into which the oil is fed through the discharge head S. This retort is contained within the furnace in which a fire is burning to heat the retort which thus acts as a volatilization or diffusion zone. The material then passes through the pipe $R^1$ into the combustion zone C which as indicated is located within a separate housing $R^2$ that contains the fixing bed, which in this instance is supported upon a grate $R^3$.

It will be understood that the pipe $M^2$ controlled as indicated is provided for the purpose of introducing air, water, steam or water vapor into the retort for the purpose of assisting the formation of gas in the usual manner.

In the modified forms shown in Figs. 5, 6 and 7, it will be noted that means are not provided for introducing the cooling medium into the volatilizing chamber. This is because other means are provided for cooling. In one case a coil containing the cooling fluid is located within the diffusion chamber. In another case the diffusion chamber is water jacketed. In another case baffles are interposed between the diffusion and combustion chamber so as to modify the heat prevalent in the diffusion chamber as a result of the heat in the combustion chamber.

The use and operation of my invention are as follows:

The liquid hydro-carbon and air are introduced with or without steam, water vapor or some similar substance into the volatilizing and diffusion chamber, preferably all three or air and the liquid hydrocarbon fuel if no steam is used are introduced together in such manner that they may from the start be intermixed and commingle, though it is obvious that they might be introduced separately if other arrangements are made to insure their commingling. The heat from the combustion chamber or any other suitable source, acting upon the finely comminuted hydro-carbon intermingled as it is with air and water if such is present, results in a vaporization and volatilization of the liquid hydro-carbon assisted and encouraged of course by the normally rapid diffusion qualities of the hydro-carbon and thus a diffused vaporized or volatilized hydro-carbon and air mixture results. If proper proportions of liquid hydro-carbon steam and air have been led to the diffusion chamber, the result will be a homogeneous mixture which will pass onward into the combustion zone where decomposition and recombination will take place, resulting in a producer gas which may then, if desired, pass through the heated carbonaceous bed for further fixing.

It is obvious that this will not take place if the proportions of the air liquid, hydrocarbon and water if any is present, are not correct, and so the operator by observing the conditions prevalent within the volatilizing zone through any suitable observation aperture or by watching the resultant product of the producer must adjust the relative supply until the correct proportion is attained. If, on inspection, he finds that the liquid hydro-carbon issuing from the nozzle tends to ignite as it issues therethrough and form a flame in the volatilizing zone, it will be evident that the temperature is too great, and so he will supply more steam or otherwise cool down the zone until the temperature has reached a point beneath the burning temperature. If he notes that the diffusion zone of the producer presents a yellowish foggy aspect and tar appears on the scrubbing water, he will know that an excess of steam is being introduced in the diffusion zone, and he will raise the temperature until when he finds an adjustment at which the diffusion zone presents a comparatively clear transparent condition without appreciable smoke, he knows that the temperature and proportions are correct.

It is of course obvious that, in order to enable the liquid hydro-carbon steam and air to mix, volatilize and infuse in a proper and satisfactory manner, it is necessary to have the chamber of a comparatively large size so that a wide range of expansion may take place, and a more minute and intimate mixture of the air and fuel may occur. The amount of steam or the proportion of the cooling agent whatever it is, will of course vary under different circumstances, depending partially upon the character of the liquid hydro-carbon and also partially upon the amount of gas which is being made. The burning temperature of hydro-carbons varies and so in one case the high temperature may safely be used, and in other cases a lower temperature may become necessary. Of course an increase in the volume of gas tends to increase the temperature of the combustion zone, and so if the volatilization zone derives its heat by radiation therefrom, more steam must be used to keep the temperature down.

I have spoken generally of the use of steam for keeping the temperature down, and this is only because steam is a very convenient medium. It will be obvious that the operation will be exactly the same no matter what the cooling medium that is used.

In my invention, therefore, I use a retarder, and this retarder in the preferred form is steam, which steam is fed into the combustion chamber, and there is commingled with the liquid fuel or hydro-carbon or air or other oxygen carrying medium, so that the oxygen carrying medium, the fuel and the retarder are all intimately commingled and distributed. The retarder thus acts to retard combustion, and give ample time for a close and intimate mixing or diffusion of the vaporized, distilled or otherwise affected or non-affected hydro-carbon before actual flaming or partial combustion takes place. The mixture gradually passes through the device, and of course the farther it gets into the combustion chamber, the hotter it becomes, and at some point the actual partial combustion or flaming or flaring takes place to form the producer gas. This retarder might be something other than steam. It might be nitrogen or carbon monoxid, or it might be some other liquid or fluid or finely comminuted solid, but preferably it is steam, and experiment shows that the temperatures in the combustion zone, for proper operation when gas is desired low in hydrogen, must be such that they are always less than the temperature at which the steam dissociates or cracks to any considerable extent and thus when making gas engine gas most of the steam in my process which I put in as steam or water, passes through the apparatus to the scrubber first as the steam then as superheated steam, and is almost all deposited or condensed in the scrubber. There is practically no production of hydrogen. For some fuels, of course, higher temperatures might be desirable, for others lower temperatures, but in the main a temperature high enough to volatilize the fuel must prevail in the volatilizing or diffusion zone, and a temperature high enough to permit partial combustion must prevail in the combustion zone, but the first temperature must be less than the burning or flaring or flaming temperature of the fuel, and the second temperature should be less than the temperature of rapid dissociation of the water, vapor or steam into its component units of hydrogen and oxygen, when gas low in hydrogen is desired.

Under different atmospheric conditions and for different kinds of oil it may be necessary to vary the temperatures and to vary the proportions of retarder, oxygen carrying medium and oil. However, the operator can adjust all these matters by inspecting the processes going on inside the chamber. If he sees that there is a flame at the point where the fuel enters, he will increase the amount of retarder until this flame disappears. This will be an indication that the volatilizing zone is properly operating. He will manipulate the control of the retarder, the oxygen supply and the fuel supply so that there will be a dull reddish glow in the combustion zone, the idea is that he does not want to have flaming any-where and by an inspection through peepholes or other orifices the operator can see just what is taking place and he can increase or decrease the retarder and increase or decrease the fuel with respect to the oxygen so as to keep the volatilizing temperature in the volatilizing zone at a proper temperature and combustion temperature in the combustion zone without flaming of the oil in the volatilizing zone without complete burning of the oil in the combustion zone.

I have talked about hydro-carbon fuels as these are the fuels most peculiarly well adapted to carry out my process and furnish a gas by means thereof. It is conceivable that at all times liquid fuels not hydrocarbons at all might be used but I prefer the hydro-carbon as it is most satisfactory.

It is obvious that for different fuels different temperatures must prevail and that the temperatures prevailing in the gasification zone or combustion zone will vary both because of the different fuels and because of the different kinds of gases desired. Generally speaking, I find that the best result prevails when the temperatures in the volatilization zone ranges from 950° to 1050° F. while the temperature of the combustion zone ranges from 1200° to 1500° F. It is understood that the temperature in the volatilization zones comes from the temperature in the combustion zone or from some other source and that the volatilizing operation requires heat and is a consumer of heat and that the function of a retarder is to keep down and control that heat. The higher the temperature in the combustion zone the greater the danger of steam dissociation and the greater the amount of hydrogen left in the gas. Illuminating gas should be high in hydrogen; the fuel or gas engine gas should be low. Experience shows that the temperature of the combustion zone may at all times be slightly and for a short period greatly above the temperature at which steam begins to be decomposed because the process is slow at practically any temperature below 1500° and because of the contact with hot carbon is of such duration that practically speaking no hydrogen is formed. As a matter of fact experience shows that a large quantity of steam which is fed in in my preferred process is mostly found condensed in the scrubber and the free hydrogen made is practically negligible. It will be noted that while I have shown but two sources of heat for heating the volatilizing chamber, viz: the partial combustion in the combustion chamber in one case and a furnace in the other, it will be understood that two means are shown as suggestions of any suitable means which would give the necessary heat and any suitable means might be used.

Generally speaking, it will be understood that the proportion of steam to oil gasified will vary from approximately equal parts by weight of oil and steam to approximately one of oil to two of steam.

I claim:—

1. The process of making producer gas which consists in introducing liquid fuel, an oxygen carrying medium and a retarder medium into a gasifying chamber in such proportions that when the mixture is ignited in the chamber the retarder coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel and wherein partial combustion takes place to form the gas.

2. The process of making producer gas which consists in introducing liquid fuel, an oxygen carrying medium and a retarder medium into a gasifying chamber in such proportions that when the mixture is ignited in the chamber the retarder coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel and wherein partial combustion takes place to form the gas and then passing the gas thus formed through a fixing bed.

3. The process of making producer gas which consists in introducing liquid fuel, an oxygen carrying medium and a retarder medium into a gasifying chamber in such proportions that when the mixture is ignited in the chamber the retarder coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel and wherein partial combustion takes place to form the gas and then passing the gas thus formed through a carbonaceous fixing bed.

4. The process of making producer gas which consists in introducing liquid fuel, an oxygen carrying medium and a retarder medium into a gasifying chamber in such proportions that when the mixture is ignited in the chamber the retarder coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel but below 2500° F. and wherein partial combustion takes place to form the gas.

5. The process of making producer gas which consists in introducing liquid fuel, an oxygen carrying medium and steam into a gasifying chamber in such proportions that when the mixture is ignited in the chamber the steam coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel and wherein partial combustion takes place to form the gas.

6. The process of making producer gas which consists in introducing liquid fuel, an oxygen carrying medium and steam into a gasifying chamber in such proportions that when the mixture is ignited in the chamber the steam coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel and wherein partial combustion takes place to form the gas and then passing the gas thus formed through a fixing bed.

7. The process of making producer gas which consists in introducing liquid fuel, an oxygen carrying medium and steam into a gasifying chamber in such proportions that when the mixture is ignited in the chamber the steam coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel and wherein partial combustion takes place to form the gas and then passing the gas thus formed through a carbonaceous fixing bed.

8. The process of making producer gas which consists in introducing liquid fuel, an oxygen carrying medium and steam into a gasifying chamber in such proportions that when the mixture is ignited in the chamber the steam coöperates with the fuel and oxygen carrying medium to form two zones, one of them a volatilization zone wherein the temperature is maintained below the burning point of the fuel but above its volatilization point and the other a combustion zone wherein the temperature rises above the burning point of the fuel but does not rise above a temperature at which appreciable dissociation of the steam takes place and wherein partial combustion takes place to form the gas.

9. The process of making producer gas which consists in introducing liquid fuel, an oxygen carrying medium and a retarder medium together into a gasifying chamber, igniting them and increasing the amount of retarder until no flame is visible within the gasifying chamber adjacent the point at which the material enters and then increasing the amount of liquid fuel with respect to the oxygen carrying medium until the interior of the chamber removed from the supply point is filled with gases raised to a cherry glow and then passing the resultant partially burned gases through a fixing bed and discharging them in the form of producer gas.

10. The process of making producer gas which consists in introducing liquid fuel and an oxygen carrying medium into a volatilizing zone, maintaining the temperature of that zone at a point above the volatilization point of the fuel and below the burning point thereof and intimately commingling the oxygen carrying medium and the fuel therein then conveying the intimately commingled mixture to a combustion zone and maintaining the temperature there at a point above the burning temperature of the fuel.

11. The process of making producer gas which consists in introducing liquid fuel and an oxygen carrying medium into a volatilizing zone, maintaining the temperature of that zone at a point above the volatilization point of the fuel and below the burning point thereof and intimately commingling the oxygen carrying medium and the fuel therein, then conveying the intimately commingled mixture to a combustion zone and maintaining the temperature there at a point above the burning temperature of the fuel, and in controlling the relative proportion of fuel and oxygen to provide an insufficient supply of oxygen for complete combustion.

12. The process of making producer gas which consists in introducing liquid fuel, an oxygen carrying medium and a retarder medium into a gasifying chamber in such proportions that when the mixture is ignited in the chamber the retarder coöperates with the fuel and oxygen carrying medium to form two zones, one of them a volatilization zone wherein the temperature is maintained at a temperature of from 950 to 1050° Fahrenheit, and the other a combustion zone wherein the temperature is maintained at from 1200° to 1500° Fahrenheit, and wherein partial combustion takes place to form the gas.

13. The process of making producer gas which consists in introducing oxygen together with an excess of liquid fuel into a gasifying chamber, and there forming two zones, one a volatilizing zone and maintaining the temperature thereof below the burning point, but above the volatilizing point of the fuel, and passing the material from such zone to a gasification zone wherein the temperature is maintained above the burning point of the fuel and partial combustion takes place to form the gas.

In testimony whereof, I affix my signature in the presence of two witnesses this 10th day of Feb., 1915.

HARRY A. GRINE.

Witnesses:
J. A. REAVIS,
H. E. HULEN.